June 10, 1952      A. H. SUMNER      2,600,082
BOAT LOADING DEVICE FOR AUTOMOBILE TOPS
Filed Jan. 16, 1948      2 SHEETS—SHEET 2
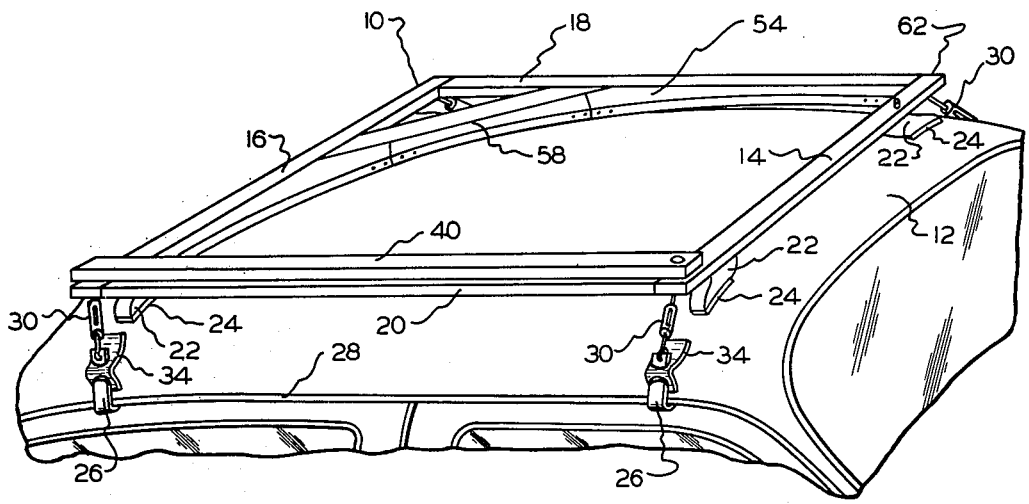
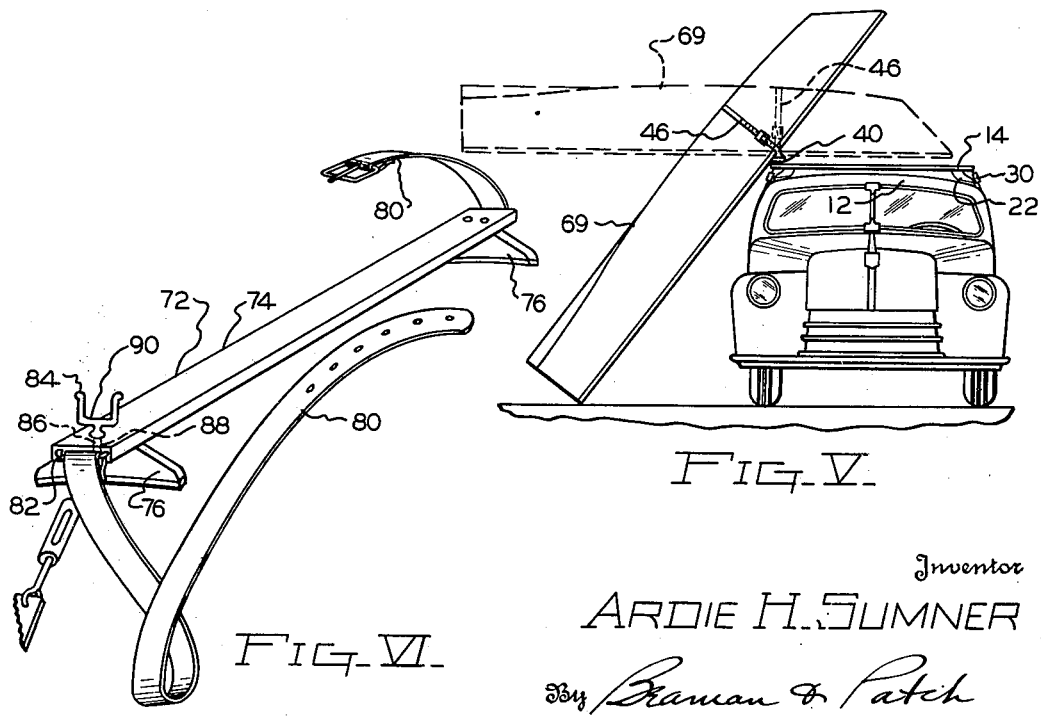
Inventor
ARDIE H. SUMNER
By Braman & Patch
ATTORNEYS Patented June 10, 1952

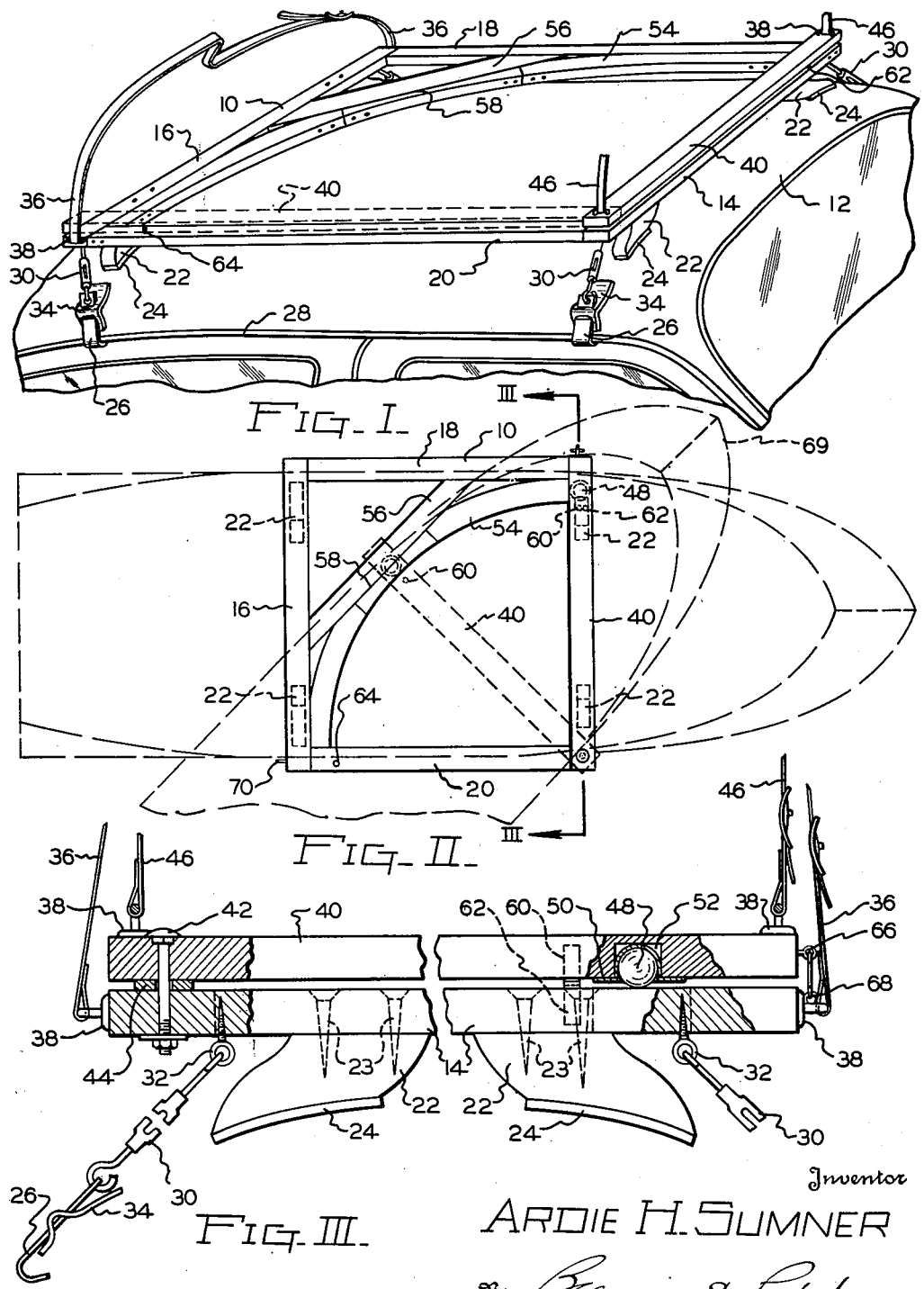

2,600,082

UNITED STATES PATENT OFFICE 2,600,082

BOATLOADING DEVICE FOR AUTOMOBILE TOPS

Ardie H. Sumner, Jackson, Mich.; Birdie V. Sumner administratrix of said Ardie H. Sumner, deceased Application January 16, 1948, Serial No. 2,567

7 Claims. (Cl. 224—42.1)

This invention relates to racks or supporting frames known as "car top carrier," and more particularly providing a loading device associated with a car top carrier so that a bulky, cumbersome object such as a fishing boat may be loaded on top of an automobile by the minimum of effort, preferably by one man.

Car top carriers for boats, ladders and other similar articles are not new, but may be purchased built of wood, angle iron, pipe, and various other materials, and are very useful in transporting small fishing boats or ladders or other bulky materials on top of the typical passenger automobile. However, the problem of loading or unloading such bulky materials from the car top carrier has always been one which has called for a maximum of physical effort, usually for several men. It is my experience that a large number of men prefer to go fishing alone, regardless of the availability of otherwise companiable acquaintances. This solitary fisherman also prefers to carry his own boat on top of his automobile to the fishing site, use the boat on the body of water being fished, and return the boat to his own home upon leaving the fishing grounds. The loading of the boat on top of the automobile by such a solitary fisherman has heretofore been a most difficult problem, and has usually been impossible without injuring either the boat, or the automobile. Various devices have been suggested for assisting the fisherman to load his boat, including the provision of rearwardly extending arms equipped with rollers over which the boat may be pushed up from the back of the car, and other similar devices. These, however, have not been found too satisfactory, since a great deal of work is still required of the fisherman, and it is extremely easy to damage the automobile while performing the operation. Car top carriers have become increasingly popular since the advent of the one-piece metal top automobile, and the problem fundamentally arose at that time. Through the years, automobiles have been steadily decreasing in overall height, but this advantage to the fisherman has been more than offset by the increased rearwardly extending portions of popular cars, so that now it is extremely difficult to load a boat over the rear of a car with the equipment available, especially for one man.

It is therefore an object of this invention to provide loading means associated with a car top carrier which will facilitate the loading and unloading of bulky, heavy objects from a car top carrier to such an extent that it may be performed by one man if necessary.

Other objects and advantages found in the construction of my invention will be apparent from a consideration of the following specification in connection with the appended claims and the accompanying drawings in which:

Fig. I is a view in perspective of a car top carrier in position on the top of an automobile with the loading arm shown in two positions, one of them in dotted outline, Fig. II is a plan view of my loader without the attachment straps or body clamps, and with a boat shown in two different positions in dotted outline, Fig. III is a broken view partially in section along the line III—III of Fig. II and showing the details of construction of the loading arm, Fig. IV is a view similar to Fig. I, with the loading arm in position for loading, and the tie down straps not shown, Fig. V is a view in elevation showing the method of loading the boat, and Fig. VI is a perspective view of a slightly different style of car top carrier, with a different type of pivoted loading member.

In the drawings, I have shown a car top carrier 10 constructed of hard wood and in position in Fig. I on a car top 12. The carrier 10 comprises the front cross member 14, the rear cross member 16 and the attached side members 18 and 20. The frame members are suitably joined together and may be supported on the car top 12 by feet 22 which I have shown constructed of wood and attached to the members 14 and 16 by the screws 23, and with felt pads 24 placed on the under side thereof. A plurality of suction cup type feet may be substituted for the feet 22 and the same result accomplished. The car top carrier 10 is held in position rigidly on the car top 12 by means of the engagement of body clamps or hooks 26 which are hooked tightly under the eavestrough beading 28 and then are tightened up by means of the trunbuckles 30. The turnbuckles 30 may be attached to the carrier 10 by means of the screw eyes 32, and the felt pads 34 are furnished so that the car top 12 will not be marred in any way by the attachment structure. A long strap 36, partially shown in Fig. I is attached near the rear of the carrier 10 preferably by the U-clamps 38 which are attached to the cross member 16.

I recognize that all of the structure heretofore described is old, and that all of it may be constructed in a number of different ways, such as by substituting metal for the hard wood of the frame portion and by substituting suction cups or similarly functioning parts for the feet 22.

The loading arm 40 is approximately equal in length to the front cross member 14, and is pivotally mounted adjacent the junction of the front cross member 14 and the side member 20 by means of the bolt 42. Since the loading arm 40 is subject to considerable weight and movement, I find it best to provide some sort of a bearing 44 at the pivotal mounting point so that the arm 40 may be moved as easily as possible. The arm 40 is equipped with a strap 46 which is similar in size and function to the strap 36, and is attached to the arm 40 by the fittings 38. To furnish a rolling support for the moving end of the loading arm 40, I have provided the large metal ball 48 which is housed in the fitting 50 which is in turn mounted in the aperture 52 which opens on the under side of the loading arm 40. A small wheel or caster suitably mounted would perform the same function in a satisfactory manner. In the carrying position the ball 48 rests on the front cross member 14 as shown in Figs. II and III, in the loading position the ball 48 rests on the side member 20, as shown in Fig. I. For supporting the ball 48 and therefore the loading arm 40 during the rotating motion of the arm 40 when loading a boat or similar article, I have provided the radial track 54. The radial track 54 is formed with all points equidistant from the pivot point at the bolt 42, and has its one end joining with the front cross member 14 adjacent its junction with the side member 18, and its other end joining the side member 20 adjacent its junction with the rear cross member 16. It might be possible, using certain types of very stiff material, to use the track 54 under a heavy load without bracing to support the load, but I have found, in constructing my rack or carrier 10 of wood, that it is necessary to use a tangential type brace 56 which is fastened to the side member 18 and the rear cross member 16 and which has a fairly long edge contiguous with the track 54 as at 58. To limit the travel of the loading arm 40, I have provided on its under face an upper stop pin 60 which, in the carrying position engages the lower stop pin 62 which projects out of the upper face of the front cross member 14, and in the loading position engages the lower stop pin 64 which projects out of the upper face of the side member 20. To hold the loading arm 40 in either of its two stationary positions, I have provided a screen door hook 66 which may be engaged with the screw eye 68 in the end of the front cross member 14 when the loading arm is in the carrying position, and which may be engaged with the screw eye 70 when the loading arm is in the loading position as shown in dotted outline in Fig. I.

In operation, my boat loader is prepared for loading by rotating the loading arm 40 about the pivot point or the bolt 42 to the position shown in dotted outline in Fig. I. The screen door hook 66 is engaged with the screw eye 70 to hold the loading arm in position and the straps are loosened and then allowed to fall down the side of the car. With the equipment in this position, a boat may be leaned up against the side of the loading arm 40, preferably with the bow pointed up, and the strap 46 is secured as tightly as possible around the boat. The screen door hook 66 is then disengaged from the screw eye 70, the stern of the boat is lifted so that the boat rotates about the loading arm 40, and the arm 40 takes the large part of the weight of the boat. From this position, and with the stern of the boat lifted into the air, the operator walks toward the rear of the automobile, carrying the rear end of the boat, until the longitudinal axis of the boat is parallel with that of the automobile, and part of the boat is positioned over the rear cross member 16, at which time the rear of the boat is lowered so that the boat 69 rests on the rear cross member 16. It will be appreciated that during this movement the loading arm 40 has rotated about its pivot point, with the steel ball 48 riding along the track 54 which supports the weight, and that the top stop pin 60 has engaged the bottom stop pin 62. The rear strap 36 may now be thrown across the boat 69 and tightened securely, followed by a retightening of the front strap 46. The screen door hook 66 is then engaged in the screw eye 68, thereby completing the operation. The unloading of a boat would be accomplished by exactly the reverse operation.

In Fig. VI is shown an alternative construction which utilizes action similar to that used by the structure shown in the other five figures. There a car top carrier 72 comprising a single transverse member 74 mounted on supporting feet structure 76 adapted to engage the top of an automobile (not shown), is held in position by the turnbuckle structure 78 which is similar to that shown in Figs. I, III, and IV. A tiedown strap 80 is attached to the carrier 72 by the fittings 82, and a pivoting member 84 is positioned for pivotal movement adjacent one end of the transverse member 74. The member 84 comprises a lower shaft 86 engageable in the aperture 88 for pivotal movement, and an upper U-shaped portion 90 shaped to engage an upstanding side of the boat 69 to be loaded and carried.

In the use of the loader of this type, the boat 69 is positioned as shown in full line in Fig. IV, with a portion of the upstanding side of the boat resting in the U-shaped portion 90. The boat 69 may then be lifted, as shown in Fig. V, and rotated around as when using the other type of loader. It will be found necessary to steady the unsupported side of the boat during the lifting and pivoting operation when using this alternative structure, but if the boat is not too large it will be found possible to load it in this manner.

Having thus described my invention, what I claim as new and desire to protect by Letters Patent is:

1. A car top carrier comprising a frame, means supporting said frame on top of an automobile, means for holding said frame in a selected position on top of an automobile, a loading arm pivotally mounted relative to said frame for movement about a vertical axis, supporting means associated with said frame and acted upon by said loading arm, and load retaining means associated with said frame to hold a load on said frame.

2. A carrier for use on top of an automobile comprising a frame supported and secured to said top, a movable arm pivotally mounted on said frame for movement parallel to the plane of said frame, an arcuate track portion supported by said frame and radially centered relative to said pivotally mounted movable arm, attaching means associated with said arm to secure a load thereto for pivotal movement thereof, and attaching means associated with said frame to secure a load thereto.

3. A carrier accessory for an automobile top comprising rack structure securely mountable on said top, a movable arm pivotally mounted adjacent one of the ends of said arm on said rack structure for movement about a vertical axis, supporting means associated with the other end of said movable arm, a supporting track associated with said rack structure and shaped and positioned to be engaged by said supporting means when said arm is moved pivotally, and attaching means associated with said rack structure to hold a load thereon.

4. An improvement in car top carriers comprising a loading arm pivotally supported adjacent its one end and one side by said carrier for movement about a vertical axis, supporting means associated with said loading arm adjacent its free end, and an arcuate track associated with said carrier and adapted to support said supporting means when said loading arm is being moved pivotally.

5. A carrier for use on top of an automobile comprising a main frame adapted to be supported parallel to the longitudinal axis of the automobile, superstructure for loading materials onto said carrier including a member supported for pivotal movement around a point adjacent one end and one side of said main frame for movement about a vertical axis, said member being adapted to pivot from a position substantially parallel to the axis of the automobile to a position substantially transverse to the axis of the automobile.

6. A boat carrier for use on top of an automobile comprising a main frame having end members and side members and supported parallel to the longitudinal axis of the automobile, a pivot structure defined adjacent the junction of one of the end members with one of the side members for movement about a vertical axis, and means to engage a boat to support the boat for pivotal movement about said pivot structure from a position transverse to the longitudinal axis of the automobile to a position parallel to the longitudinal axis of the automobile.

7. A boat carrier for use on top of an automobile comprising a rack supported on top of an automobile, and a loading arm supported for pivotal movement about a vertical axis about one corner of said rack such that a boat is carried parallel to the longitudinal axis of the automobile with the loading arm transverse to said axis, and a boat is loaded with said arm in a position substantially parallel to said axis.

ARDIE H. SUMNER.

REFERENCES CITED

The following references are of record in the file of this patent:

UNITED STATES PATENTS

| Number | Name | Date |
|---|---|---|
| 1,889,350 | Cohen-Venezian | Nov. 29, 1932 |
| 2,180,032 | Casley | Nov. 4, 1939 |
| 2,395,173 | Dobler | Feb. 19, 1946 |
| 2,412,162 | Lindblom | Dec. 3, 1946 |
| 2,446,092 | Lait | July 27, 1948 |
| 2,448,591 | Harder | Sept. 7, 1948 |
| 2,469,945 | Brei | May 10, 1949 |
| 2,469,987 | Pilsner | May 10, 1949 |
| 2,470,848 | Guest | May 24, 1949 |
| 2,479,035 | Burkey | Aug. 16, 1949 |
| 2,486,316 | Morse et al. | Oct. 25, 1949 |
| 2,506,421 | Hacker et al. | May 2, 1950 |